United States Patent
Georgy et al.

(10) Patent No.: US 10,274,317 B2
(45) Date of Patent: Apr. 30, 2019

(54) METHOD AND APPARATUS FOR DETERMINATION OF MISALIGNMENT BETWEEN DEVICE AND VESSEL USING RADIUS OF ROTATION

(71) Applicant: InvenSense, Inc., San Jose, CA (US)

(72) Inventors: Jacques Georgy, Calgary (CA); Medhat Omr, Calgary (CA); Aboelmagd Noureldin, Calgary (CA)

(73) Assignee: InvenSense, Inc., San Jose, CA (US)

( * ) Notice: Subject to any disclaimer, the term of this patent is extended or adjusted under 35 U.S.C. 154(b) by 296 days.

(21) Appl. No.: 14/917,730

(22) PCT Filed: Sep. 8, 2014

(86) PCT No.: PCT/CA2014/000670
§ 371 (c)(1),
(2) Date: Mar. 9, 2016

(87) PCT Pub. No.: WO2015/035497
PCT Pub. Date: Mar. 19, 2015

(65) Prior Publication Data
US 2016/0216112 A1    Jul. 28, 2016

Related U.S. Application Data

(60) Provisional application No. 61/878,336, filed on Sep. 16, 2013.

(51) Int. Cl.
*G01C 19/00* (2013.01)
*G01B 5/24* (2006.01)
(Continued)

(52) U.S. Cl.
CPC .............. *G01C 19/00* (2013.01); *G01B 5/24* (2013.01); *G01C 21/16* (2013.01); *G01C 21/20* (2013.01);
(Continued)

(58) Field of Classification Search
USPC ......................................................... 702/150
See application file for complete search history.

(56) References Cited

U.S. PATENT DOCUMENTS 3,432,856 A * 3/1969 Buell .................... G01C 21/165
33/323
3,936,947 A * 2/1976 Knapp ..................... G01C 1/00
33/275 G (Continued)

*Primary Examiner* — Igwe U Anya
(74) *Attorney, Agent, or Firm* — Bay Area Technology Law Group PC

(57) ABSTRACT

The present disclosure relates to a method and apparatus for determining the misalignment between a device and a platform (such as for example a vessel or vehicle) using radius of rotation of the device, wherein mobility of the device may be constrained or unconstrained within the platform. The device may be moved or tilted to any orientation within the platform and still provide a seamless navigation solution without degrading the performance of this navigation solution. This method can utilize measurements (readings) from sensors (such as for example, accelerometers, gyroscopes, etc.) whether in the presence or in the absence of navigational information updates (such as, for example, Global Navigation Satellite System (GNSS) or WiFi positioning).

21 Claims, 2 Drawing Sheets an exemplary block diagram of the present method (optional routine are showed in dotted lines)

(51) Int. Cl.
  *G01S 19/47* (2010.01)
  *G01S 19/49* (2010.01)
  *G01S 5/02* (2010.01)
  *G01C 21/16* (2006.01)
  *G01C 25/00* (2006.01)
  *G01C 21/20* (2006.01)

(52) U.S. Cl.
  CPC .......... *G01C 25/005* (2013.01); *G01S 5/0263* (2013.01); *G01S 19/47* (2013.01); *G01S 19/49* (2013.01)

(56) References Cited

U.S. PATENT DOCUMENTS

| | | | | |
|---|---|---|---|---|
| 4,070,674 | A * | 1/1978 | Buell | F41G 5/12 |
| | | | | 342/117 |
| 7,756,670 | B2 * | 7/2010 | Mancosu | B60T 8/172 |
| | | | | 702/151 |
| 8,781,737 | B2 * | 7/2014 | Czompo | G01S 19/49 |
| | | | | 342/357.47 |
| 8,917,203 | B2 * | 12/2014 | Ingvalson | G01C 21/165 |
| | | | | 342/104 |
| 9,151,613 | B2 * | 10/2015 | Czompo | G01C 21/00 |
| 9,494,428 | B2 * | 11/2016 | Mizuochi | G01C 21/16 |
| 2005/0027473 | A1 * | 2/2005 | Davidson | G01B 11/275 |
| | | | | 702/151 |
| 2012/0022780 | A1 * | 1/2012 | Kulik | G01C 21/28 |
| | | | | 701/498 |
| 2014/0129170 | A1 * | 5/2014 | Ramachandran | G01P 21/00 |
| | | | | 702/93 |
| 2014/0310967 | A1 * | 10/2014 | Nagornov | G01B 21/26 |
| | | | | 33/301 |

* cited by examiner an exemplary block diagram of the present method (optional routine are showed in dotted lines)

METHOD AND APPARATUS FOR DETERMINATION OF MISALIGNMENT BETWEEN DEVICE AND VESSEL USING RADIUS OF ROTATION

RELATED APPLICATIONS

This application claims the benefit of U.S. Provisional Patent Application No. 61/878,336, filed on Sep. 16, 2013, which is hereby incorporated by reference in its entirety.

TECHNICAL FIELD

The present disclosure relates to a method and apparatus for determining the misalignment between a device and a platform (such as for example a vessel or vehicle), wherein mobility of the device may be constrained or unconstrained within the platform.

BACKGROUND

Inertial navigation of a platform is based upon the integration of specific forces and angular rates measured by inertial sensors (e.g. accelerometer, gyroscopes) by a device containing the sensors. In general, the device is positioned within the platform and commonly tethered to the platform. Such measurements from the device may be used to determine the position, velocity and attitude of the device and/or the platform.

The platform may be a motion-capable platform that may be temporarily stationary. Some of the examples of the platforms may be a vehicle or a vessel of any type. The vessel may be land-based, marine or airborne.

Alignment of the inertial sensors within the platform (and with the platform's forward, transversal and vertical axis) is critical for inertial navigation. If the inertial sensors, such as accelerometers and gyroscopes are not exactly aligned with the platform, the positions and attitude calculated using the readings of the inertial sensors will not be representative of the platform. Fixing the inertial sensors within the platform is thus a requirement for navigation systems that provide high accuracy navigation solutions.

For tethered systems, one known means for ensuring optimal navigation solutions is to utilize careful manual mounting of the inertial sensors within the platform. However, portable navigation devices (or navigation-capable devices) are able to move whether constrained or unconstrained within the platform (such as for example a vessel or vehicle), so careful mounting is not an option.

Existing portable navigation devices (or navigation-capable devices) cannot achieve accurate attitude and position of the platform unless at least one of the following three conditions is known:

1) absolute attitude angles for the device and the platform;
2) absolute attitude angles for the device and the misalignment between the device and platform; or
3) absolute attitude angles for the platform and the misalignment between the device and platform.

The first above option needs two assembly of sensors at least, one on the device and one on the platform, thus knowledge of misalignment is a key factor to enable portable navigation devices without the previously mentioned constraint.

For navigation, mobile/smart phones are becoming very popular as they come equipped with Assisted Global Positioning System (AGPS) chipsets (in addition to significantly improving the startup performance by utilizing network connection) also further use high sensitivity capabilities to provide absolute positions of the platform even in some environments that cannot guarantee clear line of sight to satellite signals. Deep indoor or challenging outdoor navigation or localization incorporates cell tower ID or, if possible, cell towers trilateration for a position fix when an AGPS solution is unavailable. Despite these two positioning methods that already come in many mobile devices, accurate indoor localization still presents a challenge and fails to satisfy the accuracy demands of today's location based services (LBS). Additionally, these methods may only provide the absolute heading of the platform without any information on the device's heading.

Many mobile devices, such as mobile phones, are equipped with Micro Electro Mechanical System (MEMS) sensors that are used predominantly for screen control and entertainment applications. These sensors have not been broadly used to date for navigation purposes due to very high noise, large random drift rates, and frequently changing orientations with respect to the carrying platform.

Magnetometers are also found within many mobile devices. In some cases, it has been shown that a navigation solution using accelerometers and magnetometers may be possible if the user is careful enough to keep the device in a specific orientation with respect to their body, such as when held carefully in front of the user after calibrating the magnetometer.

As such, there is a need for a navigation solution capable of accurately utilizing measurements from a device within a platform to determine the navigation state of the device/platform without any constraints on the platform (i.e. in indoor or outdoor environments) or the mobility of the device. The estimation of the position and attitude of the platform has to be independent of the usage of the device (e.g. the way the device is put or moving within the platform during navigation). In the above scenarios, the device can be moved or tilted to any orientation within the platform; it is required that the device provide seamless navigation even in such scenarios. This again highlights the key importance of misalignment determination between the device and platform, to enable the device to be used in any orientation with respect to the platform.

Thus methods of mitigating such problems are required for navigation using devices, wherein mobility of the device may be constrained or unconstrained within the platform, and wherein the device may be moved or tilted to any orientation within the platform.

In addition to the above mentioned application of portable devices (that involves a full navigation solution including position, velocity and attitude, or position and attitude), there are other applications (that may include estimating a full navigation solution, or an attitude only solution or an attitude and velocity solution) where the method to mitigate the aforementioned problems is needed for enhancing the user experience and usability, and may be applicable in a number of scenarios.

SUMMARY

The present disclosure relates to a method and apparatus for determining the misalignment between a device and a platform (such as for example a vessel or vehicle) using radius of rotation of the device, wherein mobility of the device may be constrained or unconstrained within the platform. The device may be moved or tilted to any orientation within the platform and still provide a seamless navigation solution without degrading the performance of this navigation solution. The sensors have a corresponding frame for the sensors' axes. The misalignment between the device and the platform corresponds to the misalignment between the frame of the sensor assembly in the device and the frame of the platform. This method can utilize measurements (readings) from sensors (such as for example, accelerometers, gyroscopes, etc.) whether in the presence or in the absence of navigational information updates (such as, for example, Global Navigation Satellite System (GNSS) or WiFi positioning).

The present method and apparatus can be used to calculate a continuous misalignment angle covering the whole misalignment space, not just discrete or pre-determined values of such angle. Furthermore, the present method can work with different device usages and orientations with respect to the platform.

The method includes the steps of:
a) Calculating the radius of rotation of the device. This may be achieved using the gyroscope and accelerometer readings or a smoothed, averaged, or filtered version thereof. The calculated radius of rotation may or may not undergo smoothing, averaging, or filtering as well.
b) Checking for small radius of rotation through checking: (i) the radius of rotation, (ii) a buffered history of the radius of rotation, (iii) a smoothed, averaged, or filtered version of the radius of rotation, or (iv) a smoothed, averaged, or filtered version of a buffered history of the radius of rotation.
c) Using the information from b) to identify and discriminate if the change in device heading is because of a turn of the device itself within the platform or vessel or because of a turn of the platform or vessel that contains the device. The information from b) can be used alone for this identification or it can be used in conjunction with other sensor readings or quantities derived thereof, such as for example the magnitude of the gyroscope readings.
d) Adjusting the misalignment value depending on the identification in c) in case the device heading change is because of a turn of the device itself within the platform or vessel. In this case the device heading change is a misalignment change.

In some embodiments, an optional routine to double check if the detected misalignment change through the above method is a legitimate change and not a noise or a redundant detection from a change that was detected already and to protect against such cases may be used.

In some embodiments, an optional routine that combines the misalignment from the method provided herein with one or more other methods for determining the misalignment between a device and a platform or vessel may be used.

Any one or any combination of the optional routines can be used.

Broadly stated, in some embodiments, a method and apparatus for determining misalignment between a device and a platform using radius of rotation of the device, wherein the device comprises sensors capable of providing sensor readings, and means to calculate heading angle of the device, the method comprising the steps of: a) calculating the radius of rotation of the device from the sensor readings; b) determining if the radius of rotation is a small radius of rotation; c) identifying if a change in device heading angle is caused by a turn of the device within the platform or a turn of the platform that contains the device by using the determination of whether the radius of rotation is a small radius; and d) adjusting the misalignment if the device heading angle change is because of a turn of the device within the platform, in said case the change in the device heading angle is the detected misalignment change used to adjust the misalignment.

DESCRIPTION OF EMBODIMENTS

The present disclosure relates to a method and apparatus for determining the misalignment between a device and a platform (such as for example a vessel or vehicle) using radius of rotation of the device, wherein mobility of the device may be constrained or unconstrained within the platform. The device may be moved or tilted to any orientation within the platform and still provide a seamless navigation solution without degrading the performance of this navigation solution. The sensors have a corresponding frame for the sensors' axes. The misalignment between the device and the platform corresponds to the misalignment between the frame of the sensor assembly in the device and the frame of the platform. This method can utilize measurements (readings) from sensors (such as for example, accelerometers, gyroscopes, etc.) whether in the presence or in the absence of navigational information updates (such as, for example, Global Navigation Satellite System (GNSS) or WiFi positioning).

The platform is a motion-capable platform that may be temporarily stationary. Some of the examples of the platforms may be a vehicle or a vessel of any type. The vessel may be land-based, marine or airborne.

Absolute navigational information is information related to navigation and/or positioning and are provided by "reference-based" systems that depend upon external sources of information, such as for example Global Navigation Satellite Systems (GNSS). On the other hand, self-contained navigational information is information related to navigation and/or positioning and is provided by self-contained and/or "non-reference based" systems within a device/platform, and thus need not depend upon external sources of information that can become interrupted or blocked. Examples of self-contained information are readings from motion sensors such as accelerometers and gyroscopes.

The present method and apparatus can be used to calculate a continuous misalignment angle covering the whole misalignment space, not just discrete or pre-determined values of such angle. Furthermore, the present method can work with different device usages and orientations with respect to the platform.

It should be noted that the present method can be used in a variety of applications including, without limitations, those that involve a navigation solution including:
position, velocity and attitude; or
only position and attitude,
or a partial navigation solution including:
only attitude and velocity; or
only attitude.

During normal use, the attitude of a device (e.g. a portable phone) changes freely. Indeed, such devices often undergo rotational movements along any of their major axes (e.g. the x-axis, y-axis and z-axis). Such axes are defined in FIG. 1, wherein the forward axis of the device is defined as x-axis, the vertical or z-axis is pointing downward and the transversal axis or y-axis is defined in a way to complete the right handed coordinate system.

Figure 1:
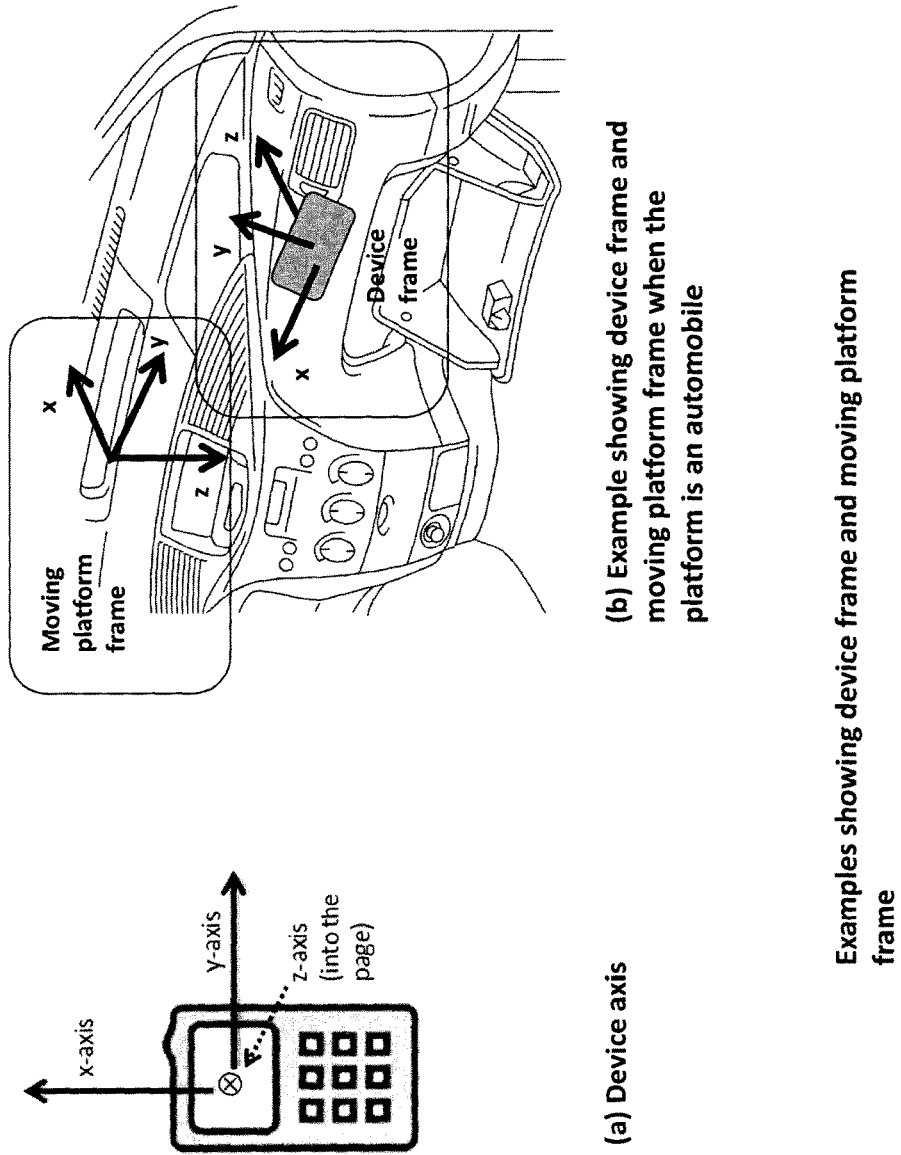
FIG. 1 shows the sensitive axes of the device (a), and a depiction of one embodiment of misalignment between the device and the platform, where the platform is a vehicle (b)

The orientation of a device within a platform is not representative of the orientation of the platform. The device may undergo any number of rotational movements along any of its major axes with respect to the platform. These rotational movements of the device do not indicate that the platform is going through the same changes in orientation. For example, the platform may be moving on a leveled 2D plane while the device may be undergoing any number of possible roll and pitch angles. FIG. 1 shows possible relationship between an unconstrained device and an example platform (an automobile).

The device includes sensors capable of providing sensor readings and a processor operative to process the present method. Typical devices include a tri-axial accelerometer for measuring accelerations or specific forces, along each of the sensitive axes, i.e., the x-axis, y-axis and the z-axis. The device may contain other sensors such as for example gyroscopes, magnetometers, barometer, among others.

Roll is defined as the rotation of the device along the forward x-axis, while pitch is the rotation along the lateral y-axis. Because the device user is free to rotate the device as desired, the device can have several changes in roll, pitch and azimuth (heading) with respect to the platform.

The present method to determine misalignment angle between a device and a platform includes the steps of:
 a) Calculating the radius of rotation of the device. This may be achieved using the gyroscope and accelerometer readings or a smoothed, averaged, or filtered version thereof. The gyroscope and accelerometer readings may or may not be compensated for their errors such as biases if such error values are available, such as for example, among others, from a navigation solution. The calculated radius of rotation may or may not undergo smoothing, averaging, or filtering as well.
 b) Checking for small radius of rotation through checking: (i) the radius of rotation, (ii) a buffered history of the radius of rotation, (iii) a smoothed, averaged, or filtered version of the radius of rotation, or (iv) a smoothed, averaged, or filtered version of a buffered history of the radius of rotation.
 c) Using the information from b) to identify and discriminate if the change in device heading is because of a turn of the device itself within the platform or vessel or because of a turn of the platform or vessel that contains the device. The information from b) can be used alone for this identification or it can be used in conjunction with other sensor readings or quantities derived thereof, such as for example the magnitude of the gyroscope readings.
 d) Adjusting the misalignment value depending on the identification in c) in the case the device heading change is because of a turn of the device itself within the platform or vessel. This case means the device heading change is a misalignment change. In some embodiments a buffered history of the device heading is used to calculate the misalignment change.

In some embodiments, an optional routine to double check if the detected misalignment change through the above method is a legitimate change and not a noise or a redundant detection from a change that was detected already, and to protect against such cases, may be used. In some of these embodiments, the protection is through a buffered history of the radius of rotation and of the detected misalignment changes. In another group of these embodiments, the protection is through time-based protections using a time threshold after legitimate changes to avoid redundant detections.

In some embodiments, an optional routine that combines the misalignment from the method provided herein with one or more other methods for determining the misalignment between a device and a platform or vessel may be used. In some of these embodiments, the combining of the misalignment calculated from different methods can be achieved by using any averaging, smoothing or filtering techniques; an example of filtering technique that may be used is Kalman filtering.

Any one or any combination of the optional routines can be used.

Figure 2:
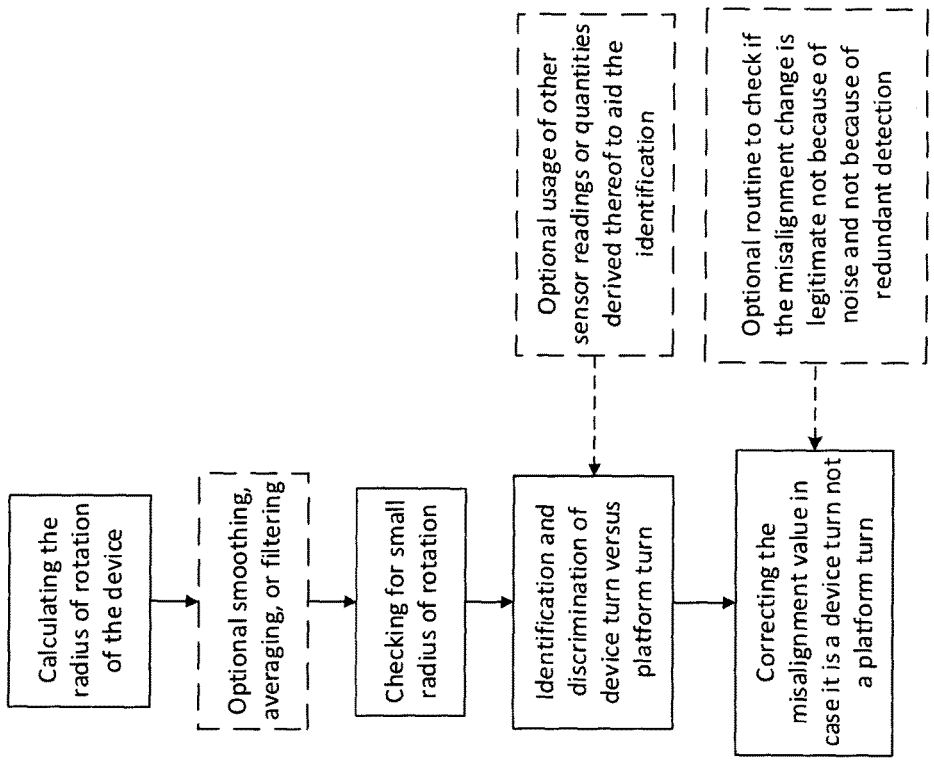
FIG. 2 is a flow chart of one embodiment of the present method.

A flow chart of one embodiment of the method described in this patent is shown in FIG. 2. The optional parts are marked with dotted lines and dotted boxes.

The method and apparatus presented herein may be combined with any navigation solution independent of the type of the state estimation or filtering technique used in this navigation solution. The state estimation technique can be linear, nonlinear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or non-linear, short memory length or long memory length) and/or automatic calibration for the errors of inertial sensors and/or the other sensors used.

The present method can be combined with a mode of conveyance technique or a mode detection technique to establish the mode of conveyance. This enables the discrimination of different scenarios, such as for example walking and driving among other possible modes.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the method presented above can be used with a navigation solution that may optionally utilize automatic zero velocity periods or static period detection with its possible updates and inertial sensors bias recalculations, non-holonomic updates module, advanced modeling and/or calibration of inertial sensor errors, derivation of possible measurements updates for the inertial sensor errors from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that the method presented above can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS), the forward integrated navigation solution in the device integrating the available sensors with the absolute navigational information (e.g. GNSS) and possibly with the optional speed or velocity readings, a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the method presented above can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the method presented above can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements, such enhancement is the carrier-smoothed pseudorange.

It is further contemplated that the method presented above can also be used with a navigation solution that relies on an ultra-tight integration scheme between GNSS receiver and the other sensors' readings.

It is further contemplated that the method presented above can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or Wimax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide a different level of accuracy. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the method presented above can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solutions (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aid from other devices and communication systems, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

It is contemplated that the method presented above can also be used with various types of inertial sensors, other than MEMS based sensors described herein by way of example.

Without any limitation to the foregoing, the embodiments presented above are further demonstrated by way of the following examples.

EXAMPLE

This example is to demonstrate a possible technique to calculate the radius of rotation "r" of an object, given its angular velocity "ω", angular acceleration "ω̇")" and translational acceleration "A"; both the angular velocity and the angular acceleration can be obtained from the gyro sensors' readings, while the translational acceleration can be obtained from the accelerometer sensors' reading after removing the gravitational component.

Optionally, the gyroscope and accelerometer readings may be smoothed, averaged, or filtered, such as for example smoothing or averaging a history of the gyroscope readings before using them to calculate the angular acceleration.

Optionally, the gyroscope and accelerometer readings may or may not be compensated for errors such as biases if such error values are available, such as for example, among others, from a navigation solution.

Eq. (1) shows the relation between the translational velocity "V" of an object and its rotational velocity "ω"

$$V = \omega \times R \quad (1)$$

where:
V: Translational velocity vector
ω: Angular velocity vector
R: Radius of rotation vector By differentiating Eq. (1), $$A = \dot{V} = \dot{\omega} \times R - |\omega|^2 R \quad (2)$$
$$= \{[\dot{\omega}_x] - |\omega|^2 [I]\} R$$

where:
A: Translational acceleration vector
ω̇: Angular acceleration vector
I: The identity matrix
and $$[\dot{\omega}_x] = \begin{bmatrix} 0 & -\dot{\omega}_z & \dot{\omega}_y \\ \dot{\omega}_z & 0 & -\dot{\omega}_x \\ -\dot{\omega}_y & \dot{\omega}_x & 0 \end{bmatrix} \quad (3)$$

then multiplying both sides of Eq. (2) by $\{[\dot{\omega}_x] - |\omega|^2 [I]\}^{-1}$ from the left, the radius of rotation of a given object can therefore be calculated as shown in the equation below $$R = \{[\dot{\omega}_x] - |\omega|^2 [I]\}^{-1} A \quad (4)$$
$$= \begin{bmatrix} |\omega|^2 & -\dot{\omega}_z & \dot{\omega}_y \\ \dot{\omega}_z & |\omega|^2 & -\dot{\omega}_x \\ -\dot{\omega}_y & \dot{\omega}_x & |\omega|^2 \end{bmatrix}^{-1} A$$

and $$r = |R| = \sqrt{R_x^2 + R_y^2 + R_z^2} \quad (5)$$

where: $R_x$, $R_y$, and $R_z$ are the three components of the R vector in the x-axis, y-axis, and z-axis direction respectively. The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The embodiments in which an exclusive property or privilege is claimed are defined as follows:

1. A method for dynamically determining misalignment between a device and a platform using radius of rotation of the device, wherein the device comprises sensors configured to provide sensor readings and means to calculate heading angle of the device, wherein the device is a portable device, wherein the method is operable when mobility of the device is constrained within the platform and when mobility of the device is unconstrained within the platform, wherein the device may be moved or tilted to any orientation within the platform, and wherein the misalignment is between a frame of the sensors in the device and a frame of the platform, the method comprising the steps of:
   a) calculating the radius of rotation of the device from the sensor readings;
   b) determining if the radius of rotation is a small radius of rotation;
   c) identifying if a change in device heading angle is caused by a turn of the device within the platform or a turn of the platform that contains the device by using the determination of whether the radius of rotation is a small radius;
   d) dynamically correcting the misalignment if the device heading angle change is because of a turn of the device within the platform, and if the device heading angle change is because of a turn of the device within the platform the change in the device heading angle is the detected misalignment change used to correct the misalignment; and
   e) providing the corrected misalignment.

2. The method of claim 1, wherein the method is usable in the absence of absolute navigational information.

3. The method of claim 1, wherein the method is usable while absolute navigational information is available.

4. The method of claim 1, wherein the device comprises gyroscopes and accelerometers.

5. The method of claim 4, wherein the calculation of the radius of rotation uses readings from the gyroscopes and accelerometers.

6. The method of claim 4, wherein the calculation of the radius of rotation is achieved using a smoothed version of the readings from the gyroscopes and accelerometers.

7. The method of claim 6, wherein the smoothed version of the readings from the gyroscopes and accelerometers is obtained through one of the following techniques: (i) averaging techniques, or (ii) filtering techniques.

8. The method of claim 4, wherein the identification of whether the change in device heading is caused by a turn of the device within the platform or a turn of the platform that contains the device uses one of the following information: (i) the radius of rotation alone, or (ii) the radius of rotation and the magnitude of the gyroscope readings.

9. The method of claim 1, further comprising smoothing of the calculated radius of rotation.

10. The method of claim 9, wherein the smoothing of the calculated value of the radius of rotation is obtained through one of the following techniques: (i) averaging techniques, or (ii) filtering techniques.

11. The method of claim 1, wherein the determination if the radius of rotation is a small radius of rotation uses one of the following: (i) the calculated value of the radius of rotation, (ii) a buffered history of the radius of rotation, (iii) a smoothed version of the radius of rotation, or (iv) a smoothed version of a buffered history of the radius of rotation.

12. The method of claim 1, wherein the identification of whether the change in device heading is caused by a turn of the device within the platform or a turn of the platform that contains the device uses one of the following information: (i) the radius of rotation alone, or (ii) the radius of rotation and other information obtained from the sensor readings.

13. The method of any one of claim 1, 5, 6, 9, 11, 12, or 8, wherein the method further comprises determining if the detected misalignment change is legitimate.

14. The method of claim 13, wherein the method further comprises determining if the detected misalignment change is noise and protecting against this detected misalignment change.

15. The method of claim 13, wherein the method further comprises determining if the detected misalignment change is a redundant detection from a previously detected misalignment change and protecting against this detected misalignment change.

16. The method of claim 13, wherein the method further comprises combining the determined misalignment with techniques for determining misalignment between the device and the platform.

17. The method of any one of claim 1, 5, 6, 9, 11, 12 or 8, wherein the method further comprises combining the determined misalignment with techniques for determining misalignment between the device and the platform.

18. A device, wherein the device is a portable device, wherein the device has constrained or unconstrained mobility within a platform, and wherein the device may be moved or tilted to any orientation within the platform, the device comprising:
   a. sensors configured to provide sensor readings; and
   b. at least one processor, coupled to receive readings from the sensors, and operative to dynamically determine misalignment between the device and the platform, wherein the misalignment is between a frame of the sensors in the device and a frame of the platform and wherein the processor is operative when mobility of the device is constrained within the platform and when mobility of the device is unconstrained within the platform to:
      i) calculate the radius of rotation of the device from the sensor readings;
      ii) determine if the radius of rotation is a small radius of rotation;
      iii) use the determination of whether the radius of rotation is a small radius to identify if a change in device heading is caused by a turn of the device within the platform or a turn of the platform that contains the device;
      iv) dynamically correct the misalignment if the device heading angle change is because of a turn of the device within the platform, and if the device heading angle change is because of a turn of the device within the platform the change in the device heading angle is the detected misalignment change used to correct the misalignment; and
      v) provide the corrected misalignment.

19. The device of claim 18, wherein the processor operates in the absence of absolute navigational information.

20. The device of claim 18, wherein the processor operates while absolute navigational information is available.

21. The device of claim 18, wherein the device comprises gyroscopes and accelerometers.

* * * * *